(12) United States Patent
Barnes et al.

(10) Patent No.: US 11,169,073 B2
(45) Date of Patent: Nov. 9, 2021

(54) APPARATUS FOR SUPPLYING REAGENTS TO A FLOW CYTOMETRY SYSTEM

(71) Applicant: Essen Instruments, Inc., Ann Arbor, MI (US)

(72) Inventors: Stephen Barnes, Albuquerque, NM (US); Zachary Kane, Albuquerque, NM (US); Richard Bennett, Albuquerque, NM (US); Jason Barrett, Albuquerque, NM (US)

(73) Assignee: Essen Instruments, Inc., Ann Arbor, MI (US)

( * ) Notice: Subject to any disclaimer, the term of this patent is extended or adjusted under 35 U.S.C. 154(b) by 432 days.

(21) Appl. No.: 16/422,814

(22) Filed: May 24, 2019

(65) Prior Publication Data
US 2020/0371012 A1    Nov. 26, 2020

(51) Int. Cl.
*G01N 15/14*    (2006.01)
*G01N 35/00*    (2006.01)
(Continued)

(52) U.S. Cl.
CPC ...... *G01N 15/1404* (2013.01); *B01F 11/0014* (2013.01); *B01L 3/508* (2013.01);
(Continued)

(58) Field of Classification Search
None
See application file for complete search history.

(56) References Cited

U.S. PATENT DOCUMENTS

| 4,146,364 A | 3/1979 | McCormick |
| 6,494,611 B2 | 12/2002 | Edwards et al. |

(Continued)

FOREIGN PATENT DOCUMENTS

| JP | S6221021 A | 1/1987 |
| JP | 2004264229 A | 9/2004 |

OTHER PUBLICATIONS

International Search Report and Written Opinion for corresponding PCT application No. PCT/US2020/024382 dated Aug. 4, 2020.
(Continued)

*Primary Examiner* — Brian R Gordon
(74) *Attorney, Agent, or Firm* — McDonnell Boehnen Hulbert & Berghoff LLP

(57) ABSTRACT

The disclosure provides example rinse station apparatus, cartridges, and methods for flow cytometry. The rinse station apparatus includes: (a) a cartridge docking station having a base with a recessed receptacle for a cartridge, a vertical support coupled to the base's first end and a top support coupled to the vertical support and cantilevered over the base, the top support has an opening that aligns with the cartridge's opening, (b) a locking arm coupled to the base's second end, the locking arm's free end has a ridge to cooperate with a detent coupled to the cartridge's rear wall to retain the cartridge in place, (c) a spring coupled to the vertical support's front face to apply force to the cartridge's front wall to bias the cartridge toward the locking arm, and (d) a load cell coupled to the base of the cartridge docking station, the load cell measure's the cartridge's weight.

24 Claims, 11 Drawing Sheets

(51) Int. Cl.
 B01L 3/00 (2006.01)
 B01L 9/00 (2006.01)
 B01F 11/00 (2006.01)

(52) U.S. Cl.
 CPC .......... B01L 9/00 (2013.01); G01N 35/00603 (2013.01); *B01F 2215/0037* (2013.01); *B01L 2200/04* (2013.01); *B01L 2200/0647* (2013.01); *B01L 2200/143* (2013.01); *B01L 2300/0609* (2013.01)

(56) References Cited

U.S. PATENT DOCUMENTS

| | | | | |
|---|---|---|---|---|
| 2004/0002163 | A1* | 1/2004 | Reinhardt | B01L 9/52 422/63 |
| 2004/0023371 | A1* | 2/2004 | Fawcett | B01L 7/52 435/303.1 |
| 2004/0029258 | A1* | 2/2004 | Heaney | B01L 9/527 435/287.2 |
| 2004/0091395 | A1* | 5/2004 | Ward | G01N 1/312 422/63 |
| 2005/0011582 | A1 | 1/2005 | Haug | |
| 2005/0136534 | A1* | 6/2005 | Austin | B01L 3/0244 435/287.2 |
| 2006/0239868 | A1* | 10/2006 | Sage | G02B 21/34 422/510 |
| 2006/0265133 | A1* | 11/2006 | Cocks | G01N 1/312 702/19 |
| 2007/0237687 | A1* | 10/2007 | Sleeper | B01L 9/52 422/562 |
| 2008/0025871 | A1 | 1/2008 | Dzenitis et al. | |
| 2011/0090563 | A1* | 4/2011 | Krasov | B01L 9/52 359/391 |
| 2011/0127292 | A1* | 6/2011 | Sarofim | G01N 35/1065 422/521 |
| 2011/0220777 | A1* | 9/2011 | Clinton | G01N 33/54366 250/208.1 |
| 2012/0085644 | A1* | 4/2012 | Renzi | G01N 27/44743 204/450 |
| 2013/0199970 | A1* | 8/2013 | El-Fahmawi | B01L 9/50 209/10 |
| 2014/0201965 | A1* | 7/2014 | Aldred | B23P 19/04 29/407.1 |
| 2014/0271407 | A1* | 9/2014 | Knorr | B01L 3/508 422/536 |
| 2015/0205089 | A1* | 7/2015 | Machida | B01L 9/52 359/391 |
| 2016/0129445 | A1* | 5/2016 | Corey | B01L 3/502715 435/286.1 |
| 2016/0299043 | A1* | 10/2016 | Kalra | G01N 1/30 |
| 2017/0059597 | A1* | 3/2017 | Huber | G01N 35/04 |
| 2017/0157615 | A1* | 6/2017 | Carrano | G01N 35/00871 |
| 2017/0173586 | A1* | 6/2017 | Tan | B01L 9/523 |
| 2018/0000463 | A1* | 1/2018 | Keller | B01L 3/50853 |
| 2018/0135119 | A1* | 5/2018 | Yan | G02B 21/245 |
| 2018/0147574 | A1* | 5/2018 | Dysli | B01L 9/523 |
| 2018/0185849 | A1* | 7/2018 | Kaplan | B01L 9/527 |
| 2019/0060936 | A1* | 2/2019 | Yokoyama | B01L 7/00 |
| 2019/0076847 | A1* | 3/2019 | Donovan | G01N 15/1484 |
| 2019/0368983 | A1* | 12/2019 | Einsle | B01L 3/52 |
| 2020/0164365 | A1* | 5/2020 | King | B01L 3/5085 |
| 2020/0188924 | A1* | 6/2020 | Richards | G01N 1/312 |
| 2020/0217763 | A1* | 7/2020 | Anderson, Jr. | B41M 5/007 |
| 2020/0241023 | A1* | 7/2020 | Boo | B01L 7/52 |
| 2020/0316608 | A1* | 10/2020 | Kojima | B01L 9/52 |

OTHER PUBLICATIONS

IQue Screener Plus hardware manual, Dec. 2016.

* cited by examiner

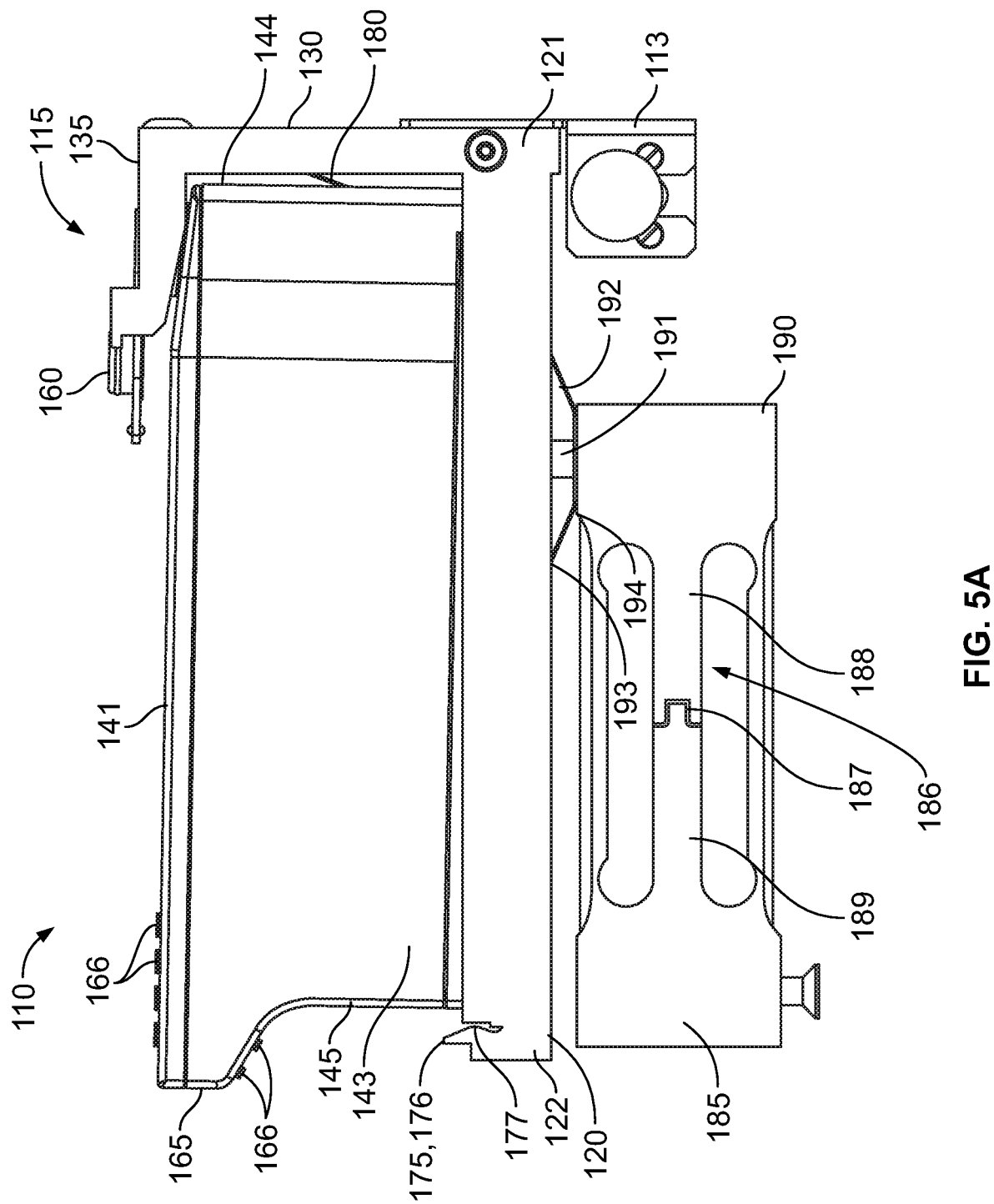

APPARATUS FOR SUPPLYING REAGENTS TO A FLOW CYTOMETRY SYSTEM

BACKGROUND

In flow cytometry, streams of cells or particles suspended in fluid are passed in front of laser beam(s). Detectors capture the way the laser light is reflected and scattered off each particle to measure its physical properties. Often this requires sampling from fluids where the particles are not dissolved and will fallout of suspension over time due to gravity. The device which samples the fluid will be unable to reach all the particles once they fallout of suspension. The fluids are usually contained in vials, assay plates, or consumable cartridges.

For fluids that are sampled from over a long duration or are left stationary for long periods prior to sampling this is problematic. For example, if the fluid is sampled from for over a few hours, the number of events passing through the flow cytometer will decrease over time as the particles fall out of suspension. This runs the risk of failed experiments and potential loss of expensive assays and reagents. The current solution is to have the user periodically agitate the cartridge or vial every few hours to re-suspend the particles. This presents an issue if the user is required to stop or pause an experiment to do so.

In particular, the iQue® PLUS is a flow cytometry system that measures cells and/or beads in liquid suspension from 96,384, 1536-well microplates. To do this, the flow cytometry system uses a metal probe connected to plastic tubing to pump the samples from the microplate to the cytometer for measurement. The pump runs continuously while the cytometer is measuring and while the probe moves from liquid sample to liquid sample in the microplate. As the probe moves between samples, air is pulled into the tubing and that air keeps the different samples separated in the tubing. The ForeCyt software looks at the stream of data received from the cytometer and virtually separates and identifies the different samples (called well Identification or Well ID).

The IntelliCyt air-gap sampling method can be confused if there are no detectable analytes in a sample. To solve this problem, extra samples which have fluorescent beads (called "marker beads") can be introduced into the sample stream around each of the samples coming from the plate. The marker beads are fluorescently dyed polystyrene microspheres mixed in liquid buffer in a marker cartridge. Marker beads are used to improve Well ID in situations where there may not be enough data for the software to correct identify and virtually separate the samples. During sampling, the probe aspirates from the marker cartridge, then from the microplate, then again from the marker cartridge, and repeats. This technique surrounds the microplate samples with marker bead "sips" which the flow cytometry system can identify and use for Well ID.

In addition, known cartridges that hold various liquids for the flow cytometry system are not resealable, permit liquid and samples to spill or splash during loading in the flow cytometry system, and are difficult to load and unload from the flow cytometry system.

SUMMARY

In a first aspect, an example rinse station apparatus for flow cytometry is disclosed. The rinse station apparatus includes (a) at least one cartridge docking station having a base with a recessed receptacle configured to receive a cartridge, a vertical support coupled to a first end of the base and a top support coupled to the vertical support and cantilevered over the base, wherein the top support has an opening arranged therethrough that is configured to align with an opening in the cartridge; (b) a locking arm coupled to a second end of the base, a free end of the locking arm has a ridge configured to cooperate with a detent coupled to a rear wall of the cartridge to retain the cartridge in place on the at least one cartridge docking station; (c) a spring coupled to a front face of the vertical support and configured to apply force to a front wall of the cartridge to bias the cartridge toward the locking arm; and (d) at least one load cell coupled to the base of the at least one cartridge docking station, wherein the load cell is configured to measure a weight of the cartridge.

In a second aspect, an example cartridge for flow cytometry is disclosed. The cartridge includes (a) a housing having a top surface, a bottom surface, a pair of opposing sidewalls, a front wall and a rear wall that together define a cavity, wherein an opening is defined through the top surface of the housing adjacent to the front wall, and the opening is surrounded by an annular ring having a shoulder at a first end and a second end that extends into the cavity; and (b) a re-sealable plug having a tubular body with a flange arranged at a first end such that the tubular body is disposed within the annular ring and the flange abuts the shoulder of the annular ring, a cap is coupled to the flange of the re-sealable plug via a living hinge and is configured to move between a sealed position in which a portion of the cap is recessed within an opening of the re-sealable plug and an unsealed position in which the cap and living hinge extend over a portion of the top surface.

In a third aspect, an example method for using a rinse station apparatus for flow cytometry is disclosed. The method includes (a) removably coupling the at least one cartridge according to the second aspect with the rinse station apparatus according to the first aspect; (b) determining, via the at least one load cell, a weight of the at least one cartridge and contents thereof; (c) receiving, via a microcontroller, a signal that includes a load cell value corresponding to the weight of the at least one cartridge; (d) in response to receiving the signal that includes the load cell value corresponding to the weight of the at least one cartridge, transmitting, via the microcontroller, a signal to an embedded processor that controls a motorized carrier coupled to a probe for sampling within the at least one cartridge; and (e) determining, via the embedded processor, a depth of the contents of the at least one cartridge based on the load cell value.

In a fourth aspect, an example non-transitory computer-readable medium is disclosed. The computer readable medium has stored thereon program instructions that upon execution by a processor, cause performance of a set of acts including (a) at least one load cell of the rinse station apparatus according to the first aspect determining a weight of at least one cartridge according to the second aspect and contents thereof; (b) a microcontroller receiving a signal that includes a load cell value corresponding to the weight of the at least one cartridge; (c) in response to receiving the signal that includes the load cell value corresponding to the weight of the at least one cartridge, the microcontroller transmitting a signal to an embedded processor that controls a motorized carrier coupled to a probe for sampling within the at least one cartridge; and (d) the embedded processor determining a depth of the contents of the at least one cartridge based on the load cell value.

The features, functions, and advantages that have been discussed can be achieved independently in various examples or may be combined in yet other examples further details of which can be seen with reference to the following description and drawings.

BRIEF DESCRIPTION OF THE DRAWINGS

FIG. 5A shows a side cross-sectional view of the rinse station apparatus with a cartridge, according to an example implementation;

Figure 1:
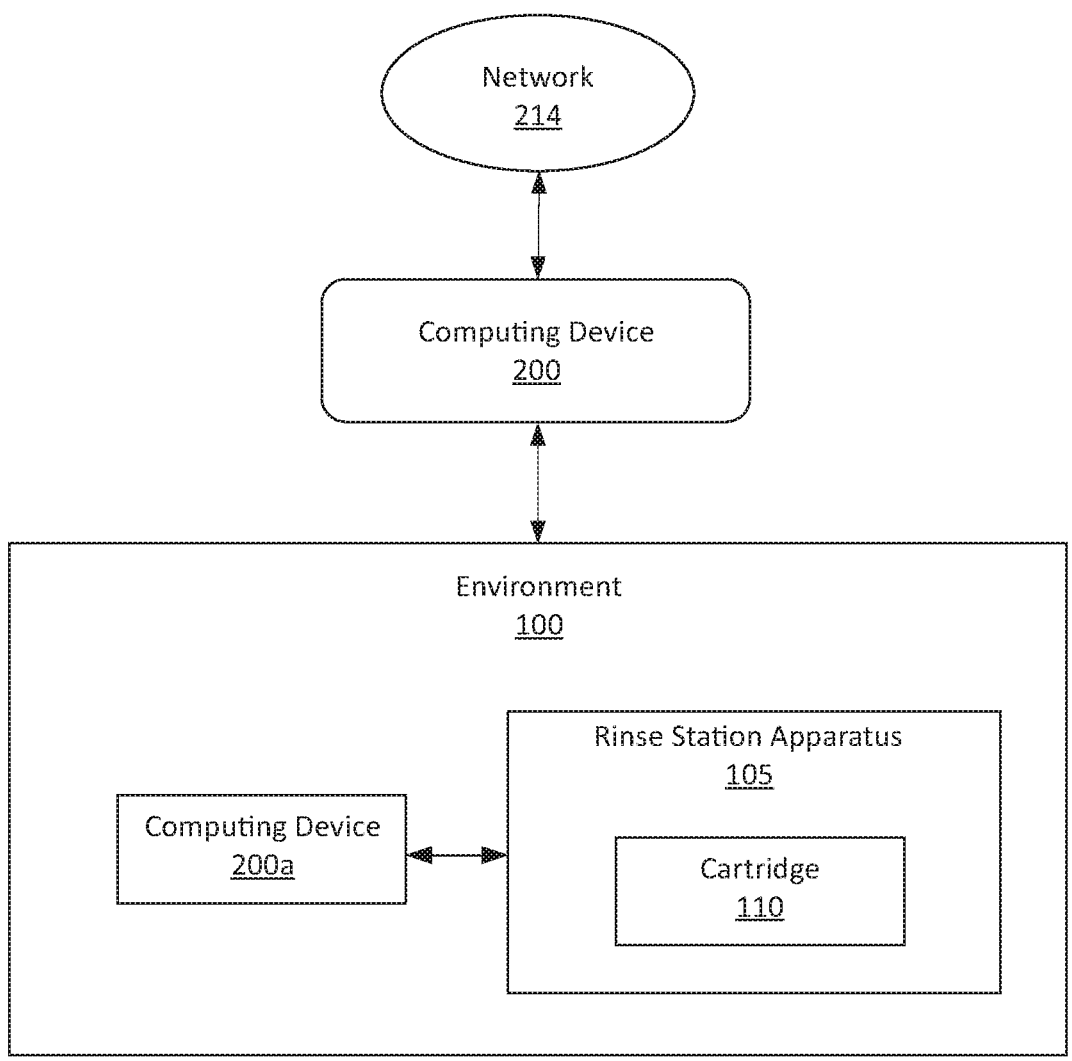
FIG. 1 is a functional block diagram of a system, according to one example implementation.

The drawings are for the purpose of illustrating examples, but it is understood that the inventions are not limited to the arrangements and instrumentalities shown in the drawings.

DETAILED DESCRIPTION

I. Overview

Embodiments of the rinse station apparatus, cartridge and methods described herein can be used to determine a weight of the cartridge and contents thereof, determine a depth of the contents of the cartridge and determine a sampling depth for a tip of a probe within the cartridge. The disclosed example rinse station apparatus, cartridge and methods also beneficially enable control of local vortexing microfuge shaker, vibration motor and/or a linear actuator to place marker beads or cells in suspension.

II. Example Architecture

FIG. 1 is a block diagram showing an operating environment 100 that includes or involves, for example, a rinse station apparatus 105 and at least one cartridge 110 shown in detail in FIGS. 3-11 and described below. Method 300 in FIG. 12 described below shows an embodiment of a method that can be implemented within this operating environment 100.

Figure 2:
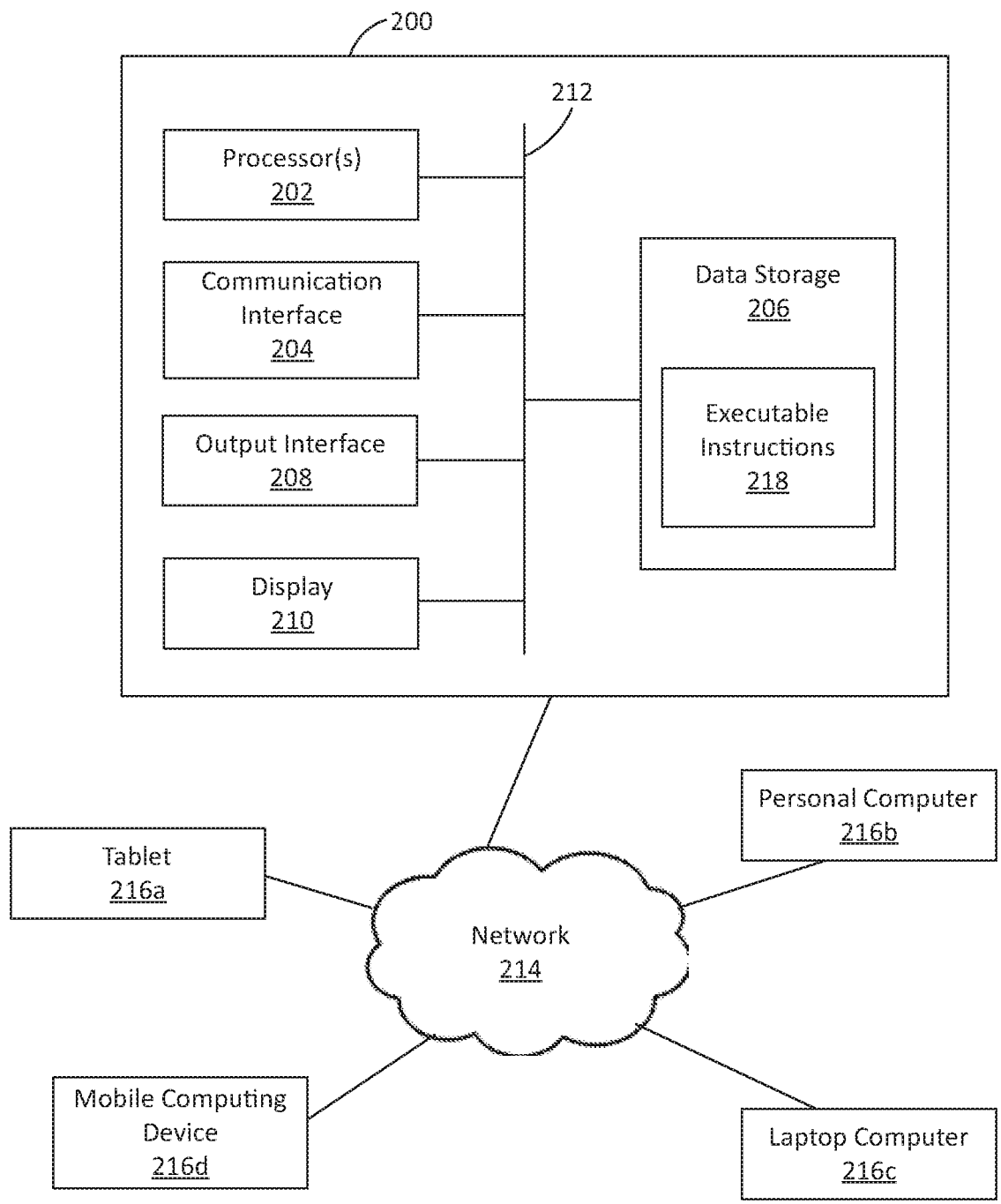
FIG. 2 depicts a block diagram of a computing device and a computer network, according to an example implementation.
Figure 3:
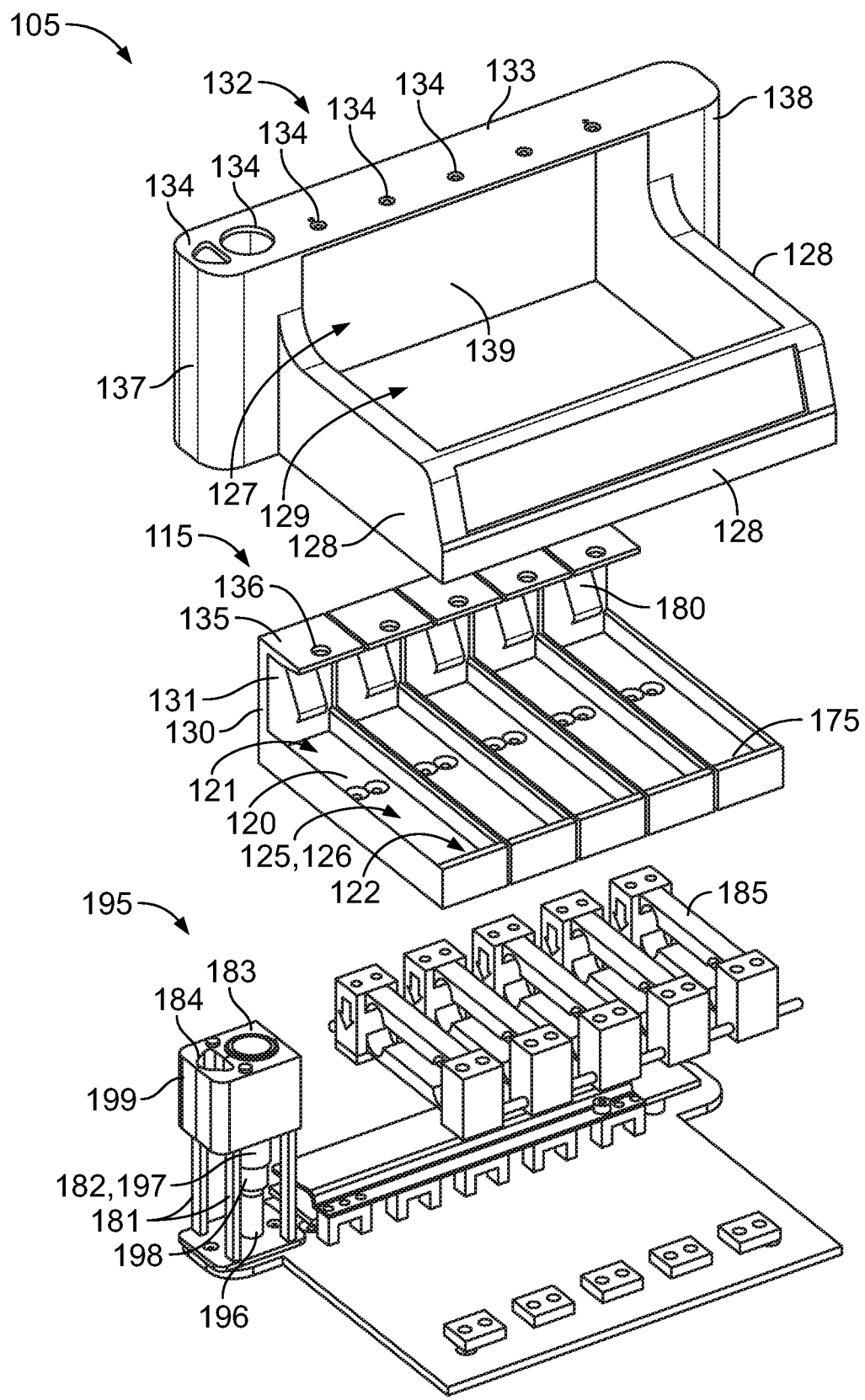
FIG. 3 shows an exploded perspective view of the rinse station apparatus, according to an example implementation.
Figure 4:
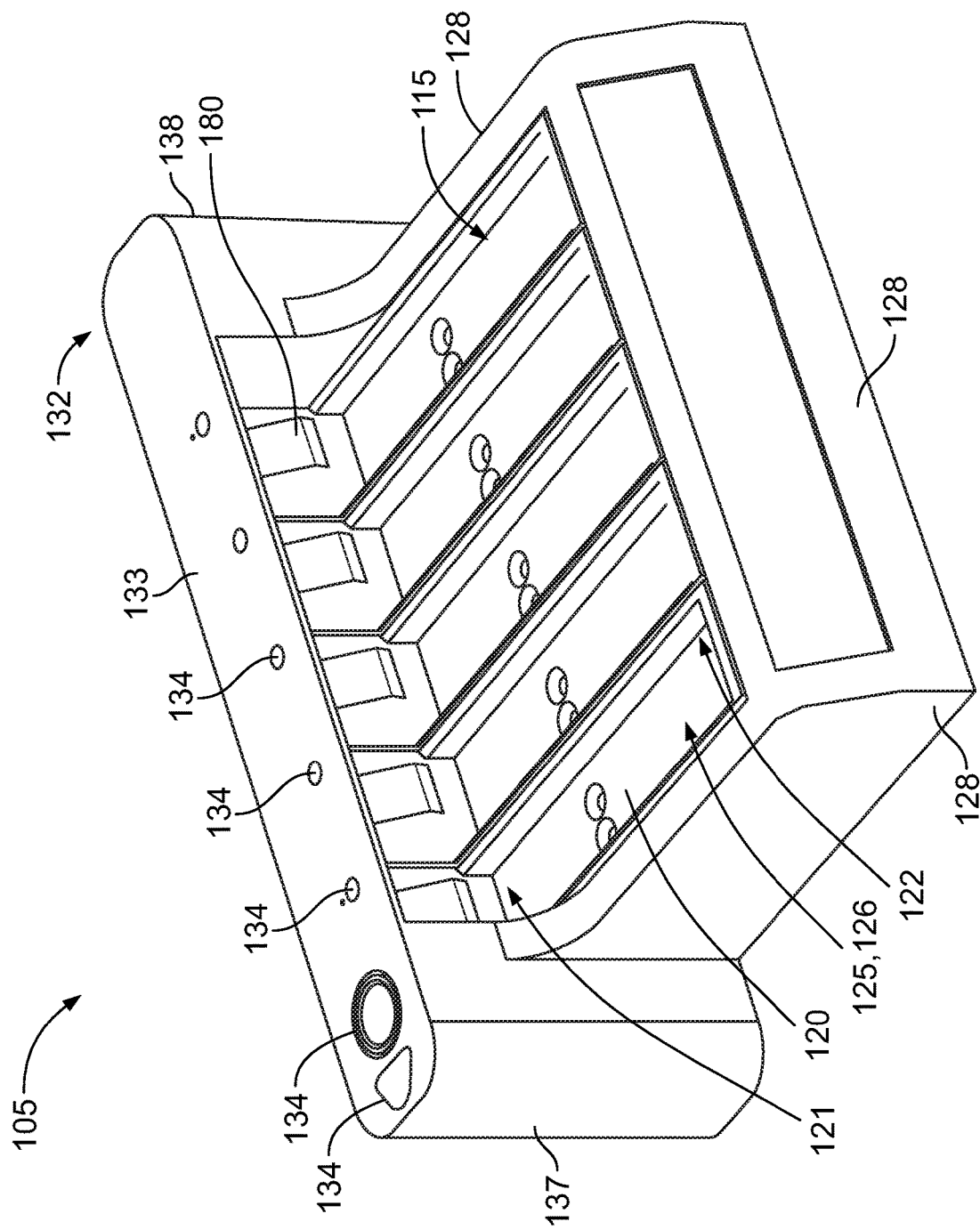
FIG. 4 shows an assembled perspective view of the rinse station apparatus, according to the example implementation of FIG. 3.

FIG. 2 is a block diagram illustrating an example of a computing device 200, according to an example implementation, that is configured to interface with operating environment 100, either directly or indirectly. The computing device 200 may be used to perform functions of the method shown in FIG. 12 and described below. In particular, computing device 200 can be configured to perform one or more functions, including determining a depth of the contents of the at least one cartridge based on the load cell value and determining a sampling depth for a tip of the probe within the cartridge, for example. The computing device 200 has a processor(s) 202, and also a communication interface 204, data storage 206, an output interface 208, and a display 210 each connected to a communication bus 212. The computing device 200 may also include hardware to enable communication within the computing device 200 and between the computing device 200 and other devices (e.g. not shown). The hardware may include transmitters, receivers, and antennas, for example.

The communication interface 204 may be a wireless interface and/or one or more wired interfaces that allow for both short-range communication and long-range communication to one or more networks 214 or to one or more remote computing devices 216 (e.g., a tablet 216a, a personal computer 216b, a laptop computer 216c and a mobile computing device 216d, for example). Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wired interfaces may include Ethernet interface, a Universal Serial Bus (USB) interface, or similar interface to communicate via a wire, a twisted pair of wires, a coaxial cable, an optical link, a fiber-optic link, or other physical connection to a wired network. Thus, the communication interface 204 may be configured to receive input data from one or more devices, and may also be configured to send output data to other devices.

The communication interface 204 may also include a user-input device, such as a keyboard, a keypad, a touch screen, a touch pad, a computer mouse, a track ball and/or other similar devices, for example.

The data storage 206 may include or take the form of one or more computer-readable storage media that can be read or accessed by the processor(s) 202. The computer-readable storage media can include volatile and/or non-volatile storage components, such as optical, magnetic, organic or other memory or disc storage, which can be integrated in whole or in part with the processor(s) 202. The data storage 206 is considered non-transitory computer readable media. In some examples, the data storage 206 can be implemented using a single physical device (e.g., one optical, magnetic, organic or other memory or disc storage unit), while in other examples, the data storage 206 can be implemented using two or more physical devices.

The data storage 206 thus is a non-transitory computer readable storage medium, and executable instructions 218 are stored thereon. The instructions 218 include computer executable code. When the instructions 218 are executed by the processor(s) 202, the processor(s) 202 are caused to perform functions. Such functions include, but are not limited to, determining a weight of the cartridge and contents thereof and determining a depth of the contents of the at least one cartridge based on the load cell value.

The processor(s) 202 may be a general-purpose processor or a special purpose processor (e.g., digital signal processors, application specific integrated circuits, etc.). The processor(s) 202 may receive inputs from the communication interface 204, and process the inputs to generate outputs that are stored in the data storage 206 and output to the display 210. The processor(s) 202 can be configured to execute the executable instructions 218 (e.g., computer-readable program instructions) that are stored in the data storage 206 and are executable to provide the functionality of the computing device 200 described herein.

The output interface 208 outputs information to the display 210 or to other components as well. Thus, the output interface 208 may be similar to the communication interface 204 and can be a wireless interface (e.g., transmitter) or a wired interface as well. The output interface 208 may send commands to one or more controllable devices, for example The computing device 200 shown in FIG. 2 may also be representative of a local computing device 200a in operating environment 100, for example, in communication with rinse station apparatus 105. This local computing device 200a may perform one or more of the steps of the method 300 described below, may receive input from a user and/or may send image data and user input to computing device 200 to perform all or some of the steps of method 300. In addition, in one optional example embodiment, the iQue® PLUS flow cytometry platform may be utilized to perform method 300 and includes the combined functionality of computing device 200 and rinse station apparatus 105.

Figure 11:
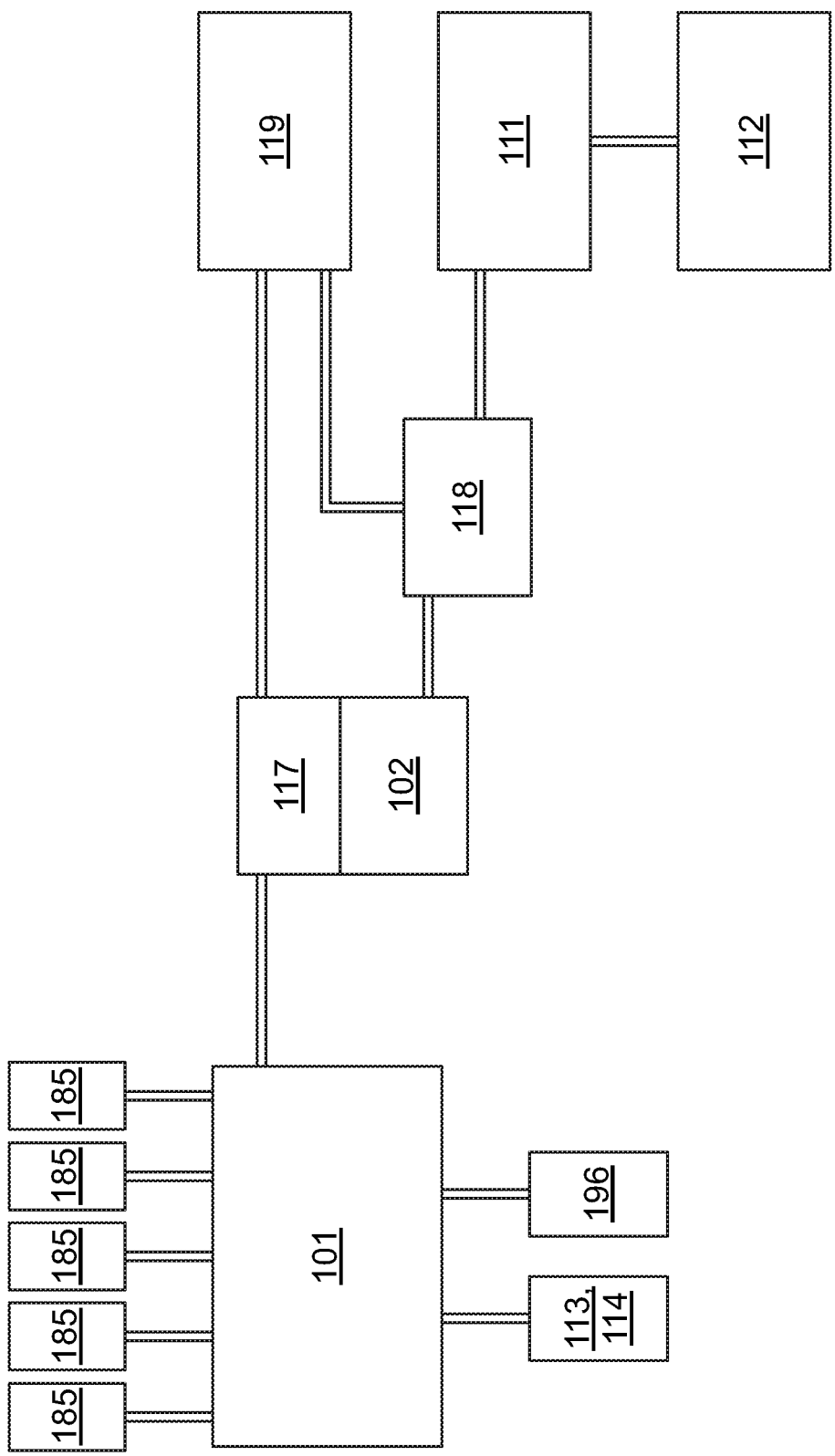
FIG. 11 depicts a block diagram of a computing device and a computer network, according to an example implementation.
Figure 12:
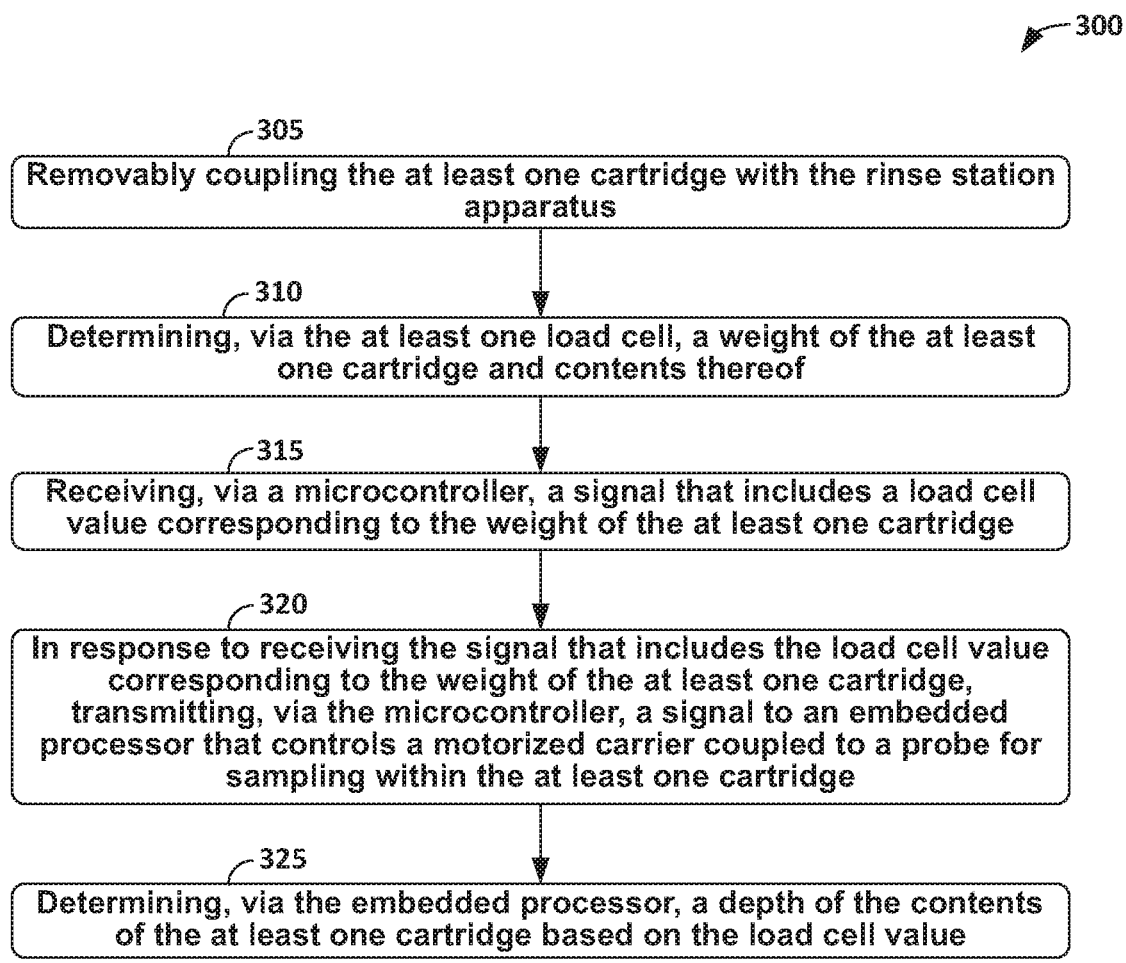
FIG. 12 shows a flowchart of a method, according to an example implementation.

FIG. 12 shows a flowchart of an example method 300 to determining, via the embedded processor, a depth of the contents of the at least one cartridge based on the load cell value, according to an example implementation. Method 300 shown in FIG. 12 presents an example of a method that could be used with the computing device 200 of FIG. 2, for example. Further, devices or systems may be used or configured to perform logical functions presented in FIG. 12, such as the microcontroller, embedded processor and workstation computer shown in FIG. 11. In some instances, components of the devices and/or systems may be configured to perform the functions such that the components are configured and structured with hardware and/or software to enable such performance. Components of the devices and/or systems may be arranged to be adapted to, capable of, or suited for performing the functions, such as when operated in a specific manner. Method 300 may include one or more operations, functions, or actions as illustrated by one or more of blocks 305-325. Although the blocks are illustrated in a sequential order, some of these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of the present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time such as register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 12, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

III. Example Rinse Station Apparatus

In a first aspect, shown in FIGS. 3-11, a rinse station apparatus 105 for flow cytometry includes at least one cartridge docking station 115 having a base 120 with a recessed receptacle 125 configured to receive a cartridge 110, a vertical support 130 coupled to a first end 121 of the base 120 and a top support 135 coupled to the vertical support 130 and cantilevered over the base 120. The top support 135 has an opening 136 arranged therethrough that is configured to align with an opening 147 in the cartridge 110. In one optional embodiment, a surface 126 of the recessed receptacle 125 that is configured to support the cartridge 110 has an angle ranging from 1 degree to 45 degrees such that the surface 126 of the recessed receptacle 125 is inclined from the first end 121 of the base 120 toward the second end 122 of the base 120.

In one optional embodiment, the rinse station apparatus 105 includes at least one cartridge 110 removably coupled to the at least one cartridge docking station 115. The cartridge 110 includes a housing 140 having a top surface 141, a bottom surface 142, a pair of opposing sidewalls 143, a front wall 144 and a rear wall 145 that together define a cavity 146. An opening 147 is defined through the top surface 141 of the housing 140 adjacent to the front wall 144. The opening 147 is surrounded by an annular ring 148 having a shoulder 149 at a first end 150 and a second end 151 that extends into the cavity 146. And the cartridge 110 includes a re-sealable plug 155 having a tubular body with a flange 156 arranged at a first end 157 such that the tubular body 158 is disposed within the annular ring 148 and the flange 156 abuts the shoulder 149 of the annular ring 148. A cap 160 is coupled to the flange 156 of the re-sealable plug 155 via a living hinge 161 and is configured to move between a sealed position in which a portion of the cap 160 is recessed within an opening 163 of the re-sealable plug 155 and an unsealed position in which the cap 160 and living hinge 161 extend over a portion of the top surface 141. In alternative embodiments, a screw-on cap or cork-like plug may be used in place of the re-sealable plug 155. One example cartridge 110 has a maximum fill volume of 51 ml, a normal fill volume of 42 ml, and a dead volume of 5 ml. The example cartridge 110 may be made of polypropylene with 3% white colorant. In addition, the example cartridge 110 may be made from two injection molded parts that are ultrasonically welded together. The re-sealable plug 155 may then be press-fit into place in the opening 147 of the top surface 141.

In one optional embodiment, the cartridge 110 includes a cone-shaped baffle 165 coupled to the second end 151 of the annular ring 148. The technical effect of the cone-shaped baffle 165 is to minimize any splashing of the contents of the cartridge 110 out of the opening 147 by dampening the liquid movement around the re-sealable plug 155. In alternative embodiments, the baffle may take the form of a rim or plate that extends radially inward from the second end 151 of the annular ring 148 thereby reducing the diameter of the opening 147 at the second end 151.

In another optional embodiment, the cartridge 110 includes a protrusion 165 coupled to and extending from the rear wall 145 of the housing 140 adjacent to the top surface 141 of the housing 140. In operation, when the cartridges 110 are installed on the cartridge docking station 115, the cartridges 110 are in a closely spaced array. As a result, cartridge 110 accessibility for handling is reduced. The protrusion 165 acts as a grip that is configured to be graspable between a finger and thumb of an operator. The protrusion 165 may optionally include ridges 166 on the top and bottom sides to improve grip. The ridges 166 may also provide a visual cue to the operator as to the location to grasp the protrusion 165. The ridges 166 are curved on the top surface for aesthetics.

In yet another optional embodiment, the cartridge 110 includes a detent 170 coupled to the rear wall 145 of the housing 140 adjacent to the bottom surface 142 of the housing 140. In this example, the detent 170 acts as heel that locks into place with the locking arm 175 described below.

Figure 8:
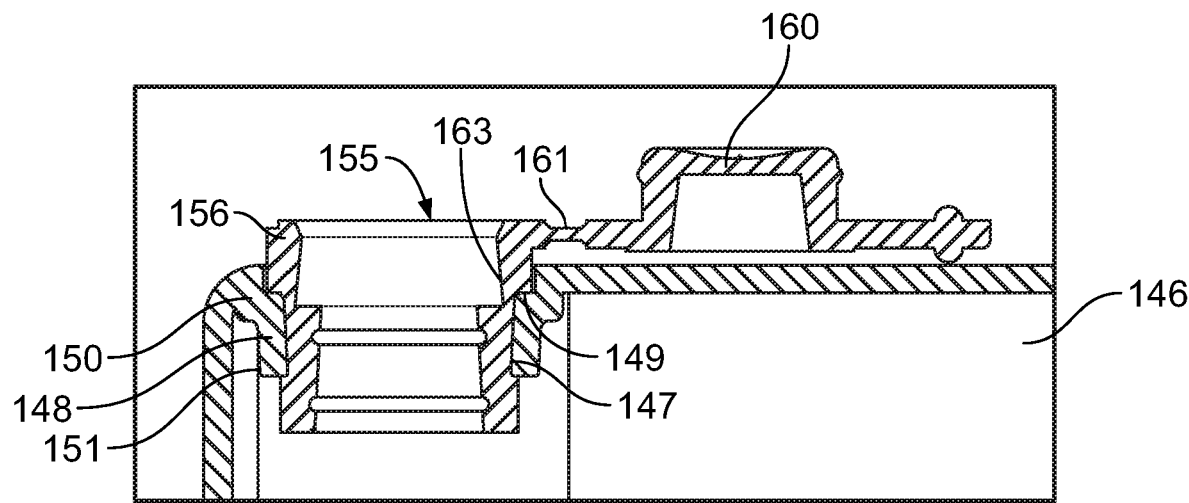
FIG. 8 shows a partial side cross-sectional view of the cartridge, according to the example implementation of FIG. 7.
Figure 9:
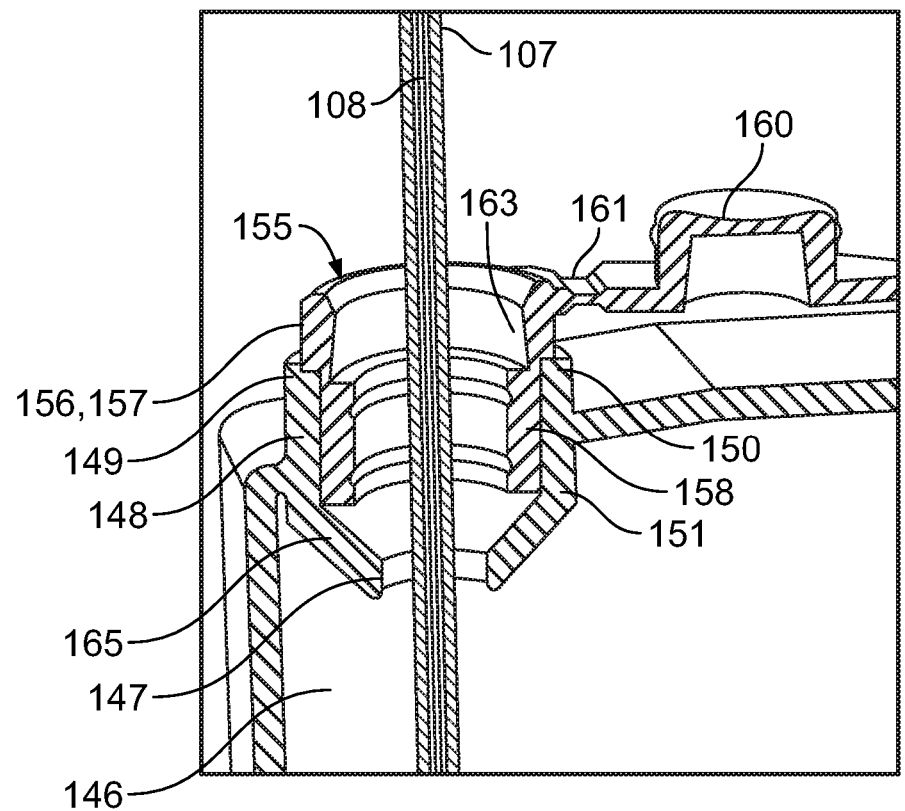
FIG. 9 shows a partial side cross-sectional view of the cartridge, according to an example implementation.
Figure 10:
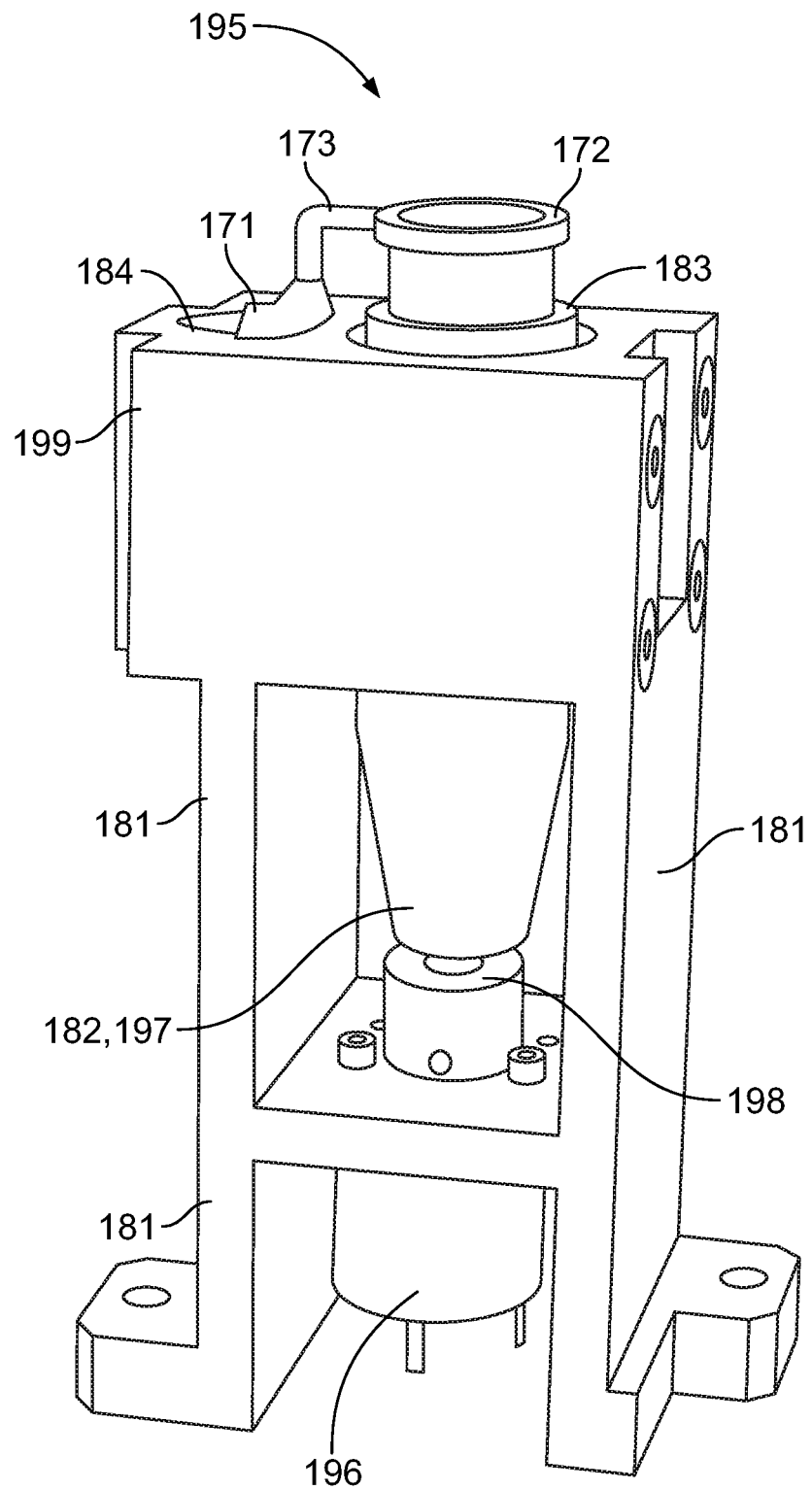
FIG. 10 shows a perspective view of a vortexing microfuge shaker, according to an example implementation.

In still another optional embodiment, shown in FIG. 8, the shoulder 149 of the annular ring 148 is inset in the top surface 141 of the housing 140. In another optional embodiment, shown in FIG. 9, the shoulder 149 of the annular ring 148 corresponds to the first end 150 of the annular ring 148 that extends above the top surface 141 of the housing 140. In a further optional embodiment, the bottom surface 142 of the housing 140 has an angle ranging from 1 degree to 45 degrees such that the cartridge 110 is inclined from the front wall 144 toward the rear wall 145. The technical effect of such an arrangement is to pool the liquid contents of the cartridge 110 under the opening 147 as the volume of the contents decreases due to sampling.

The rinse station apparatus 105 also includes a locking arm 175 coupled to a second end 122 of the base 120. A free end 176 of the locking arm 175 has a ridge 177 configured to cooperate with a detent coupled to a rear wall of the cartridge 110 to retain the cartridge 110 in place on the at least one cartridge docking station 115. In one optional embodiment, the locking arm 175 is biased toward a locked position and is configured to flex outwardly to an open position under application of a downward force or an upward force from the detent 170 of the cartridge 110.

The rinse station apparatus 105 further includes a spring 180 coupled to a front face 131 of the vertical support 130 and configured to apply force to the front wall 144 of the cartridge 110 to bias the cartridge 110 toward the locking arm 175 in the recessed receptacle 125. The technical effect of the spring 180 is to help retain the cartridge 110 in place on the cartridge docking station 115, in example embodiments, the optional detent 170 of the cartridge 110 is located under the ridge 177 of the locking arm 175. And when an operator grips the optional protrusion 165 of the cartridge 110 and applies an upward force, the spring 180 applies a force to the front wall 144 of the cartridge advancing the cartridge toward the second end 122 of the base 120 thereby increasing the ease of removal of the cartridge 110 from the cartridge docking station 115.

The rinse station apparatus 105 also includes at least one load cell 185 coupled to the base 120 of the at least one cartridge docking station 115. The load cell 185 is configured to measure a weight of the cartridge 110 and the contents therein. The technical effect of the load cell 185 and the corresponding weight value is to facilitate a determination of a sampling depth of a tip 109 of a probe 103 within the cartridge 110 and to facilitate a determination and alert for an operator indicating when the cartridge is low or empty or not loaded on the cartridge docking station 115. The load cell 185 and the corresponding weight value may also be used to calculate run-time for sampling or determine the number of well-plates that remain for sampling. Still further, alerts may be generated based on user-defined limits or thresholds that are preset on the system.

In one optional embodiment, the at least one load cell 185 has a cross-arm 186 with fixed-geometry stop 187 configured to limit displacement of the load cell 185 in response to a docking force from the cartridge 110. In one optional embodiment, shown in FIG. 5, the fixed-geometry stop 187 has the form of a keyed cut out dividing the cross-arm 186 into a first portion 188 and a second portion 189 that overlap such that the first portion 188 of the cross-arm 186 is configured to flex downward in response to a force from the cartridge 110 during docking until the first portion 188 of the cross-arm 186 contacts the second portion 189 of the cross-arm 186 at the keyed cut out. As used herein, "keyed cut out" refers to a gap between the first and second portions of the cross-arm of a load cell where the gap is shaped to provide a reciprocal male-female arrangement between the first and second portions such that these first and second portions of the cross-arm overlap and are "keyed" together. The fixed-geometry stop 187 may take many forms that prevent the load cell 185 from displacing too far and damaging the load cell's strain gauge. For example, a lockable adjustment screw, shims or other types of machined gaps may be coupled to the load cell to contact the base 120 upon displacement and to set a predetermined displacement distance. In one example, the maximum displacement is about 0.3 mm.

In one optional embodiment, the rinse station apparatus 105 includes a vortexing microfuge shaker 195 having a motor 196 coupled to a first end 182 of a carrier vessel 197 for a microfuge tube 172 via a spherical joint 198, a platform 199 suspended above the motor 196 via a plurality of uprights 181, the platform 199 supporting a second end 183 of the carrier vessel 197, the platform 199 has a cap retention cavity 184 arranged adjacent to the second end 183 of the carrier vessel 197 and that is configured to receive a cap 171 coupled to the microfuge tube 172 via a living hinge 173. The motor may take the form of an eccentric gear motor or DC motor. In one embodiment, the spherical joint 198 is coupled to the motor 196 via an off-center coupling to the motor shaft thereby imparting eccentric motion to the carrier vessel 197. In operation, the rinse station apparatus 105 can aspirate samples from the microfuge tube 172 for analysis. For example, the microfuge tube 172 can contain samples for analysis that are typically either beads or cells. The microfuge tube 172 may also contain quality control beads that have specific fluorescent properties and that allow the rinse station apparatus 105 to self-check a flow cytometer to confirm whether the flow cytometer is measuring within specifications.

The eccentric gear motor 196 is configured to rotate the first end 182 of the carrier vessel 197 off-axis. That rotation at the first end 182 causes three dimensional rotation about spherical joint 198 at the second end 183 of the carrier vessel 197. The rotation causes liquid in the microfuge tube 172 to move up the side of the microfuge tube 172 and slide along the side as it rotates which causes mixing. Experiments have shown that the vortexing microfuge shaker 195 is effective at maintaining bead and cell suspension in the liquid and can re-suspend within 15 seconds of powering on the eccentric gear motor 196.

In one optional embodiment, the at least one cartridge docking station 115 is a plurality of cartridge docking stations 115 arranged adjacent to each other, and the at least one load cell 185 is a plurality of load cells 185 each coupled to the base 120 of one of the plurality of cartridge docking stations 115. These cartridges 110 may include reagents like decontamination solution, cleaning solution, buffer solution, rinse water, and marker bead solutions. The reagents can be aspirated by the probe 103 and provide different functions. One function is to provide a buffer solution which keeps the correct air-liquid ratios in the tubing when the probe 103 is temporarily not aspirating samples from the well plate 106. Another function is to provide cleaning solutions to the probe 103 and tubing which rinse or dissolve away contaminates.

In one optional embodiment, the rinse station apparatus 105 includes a unifying housing 132 having a top surface 133 configured to overlie the top support 135 of each of the plurality of cartridge docking stations 115 and the platform 199 of the vortexing microfuge shaker 195. The top surface 133 of the unifying housing 132 has a plurality of openings 134 therethrough each aligned with one of the openings 136 of the top support 135 of the plurality of cartridge docking stations 115, an opening of the carrier vessel 197 of the vortexing microfuge shaker 195, and the cap retention cavity 184. The unifying housing 132 has a first vertical support 137 coupled to the top surface 133 at a first end. The first vertical support 137 forms a cavity configured to receive the vortexing microfuge shaker 195. The unifying housing 132 has a second vertical support 138 coupled to the top surface 133 at a second end. And the unifying housing 132 has a vertical wall 139 extending between the first vertical support 137 and the second vertical support 138 that together form a recess 127 to receive the first end 121 of the base 120, the vertical support 130 and the top support 135 of each of the plurality of cartridge docking stations 115. And the unifying housing 132 has a base frame 128 extending outward from the vertical wall 139 with an opening 129 configured to surround the plurality of cartridge docking stations 115 and the plurality of load cells 185. A height of the base frame 128 corresponds to a combined height of one of the plurality of load cells 185 coupled to one of the plurality of cartridge docking stations 115.

In one optional embodiment, shown in FIG. 11, the rinse station apparatus 105 includes a fluid station circuit board 101 electrically coupled to the at least one load cell 185. As used herein, "electrically coupled" refers to coupling using a conductor, such as a wire or a conductible trace, as well as inductive, magnetic and wireless couplings. The rinse station apparatus 105 also includes an analog-to-digital converter electrically coupled to the fluid station circuit board 101 and the at least one load cell 185. The rinse station apparatus 105 further includes a microcontroller 102 electrically coupled to the fluid station circuit board 101. And the rinse station apparatus 105 includes a probe 103 coupled to a motorized carrier 104 that is electrically coupled to the microcontroller 102. The motorized carrier 104 is configured to move between the at least one cartridge docking station 115 and a well plate 106. The probe 103 has an outer support sleeve 107 and an inner probe 108 that extends a distance beyond the outer support sleeve 107. The outer support sleeve 107 provides mechanical support to the inner probe 108. Yet a small gap exists between the outer support sleeve 107 and the inner probe 108 that may permit wicking and therefore contamination. As such, the microcontroller 102 is configured to receive a signal that includes a load cell value corresponding to a weight of the cartridge 110 and to transmit a signal to the motorized carrier 104 that includes a sampling depth for a tip 109 of the probe 103 within the cartridge 110. This has the advantage of preventing wicking action and avoiding contamination. In alternative embodiments, the signal that includes a sampling depth for a tip 109 of the probe 103 within the cartridge 110 is transmitted to the motorized carrier 104 via another processor in the operating environment 100 such as an embedded processor 111 or workstation computer 112.

In one optional embodiment, the vortexing microfuge shaker 195 is electrically coupled to the fluid station circuit board 101 and the microcontroller 102 is configured to transmit a signal to the eccentric gear motor 196 of the vortexing microfuge shaker 195 via the fluid station circuit board 101 to power on, to power off or to power on for a specified duration.

Figure 5B:
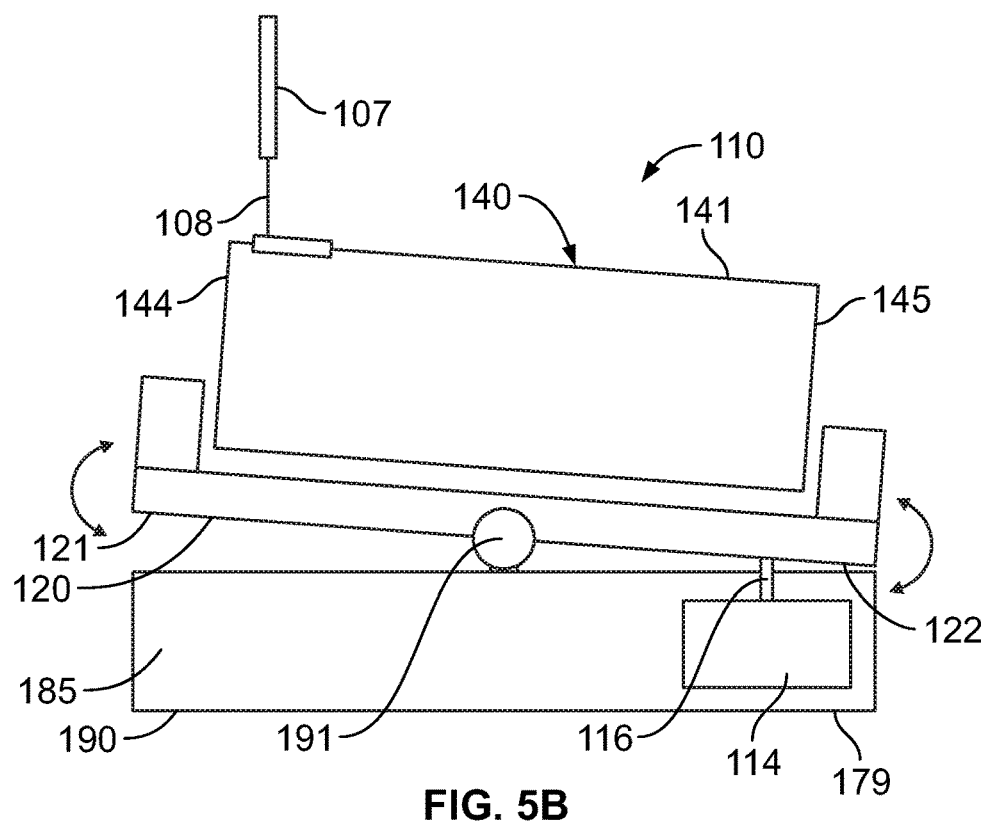
FIG. 5B shows a side cross-sectional view of the rinse station apparatus with a cartridge, according to an example implementation.
Figure 7:
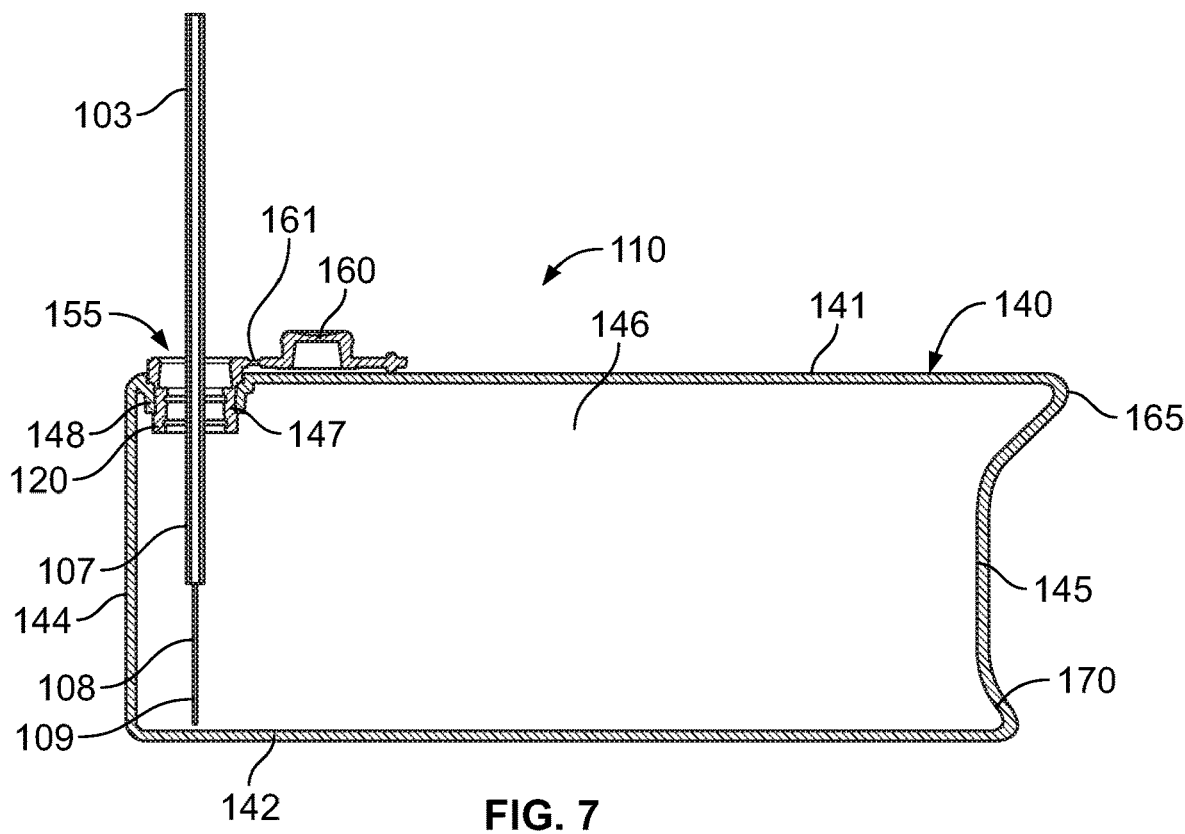
FIG. 7 shows a side cross-sectional view of the cartridge and the probe, according to an example implementation.
Figure 6:
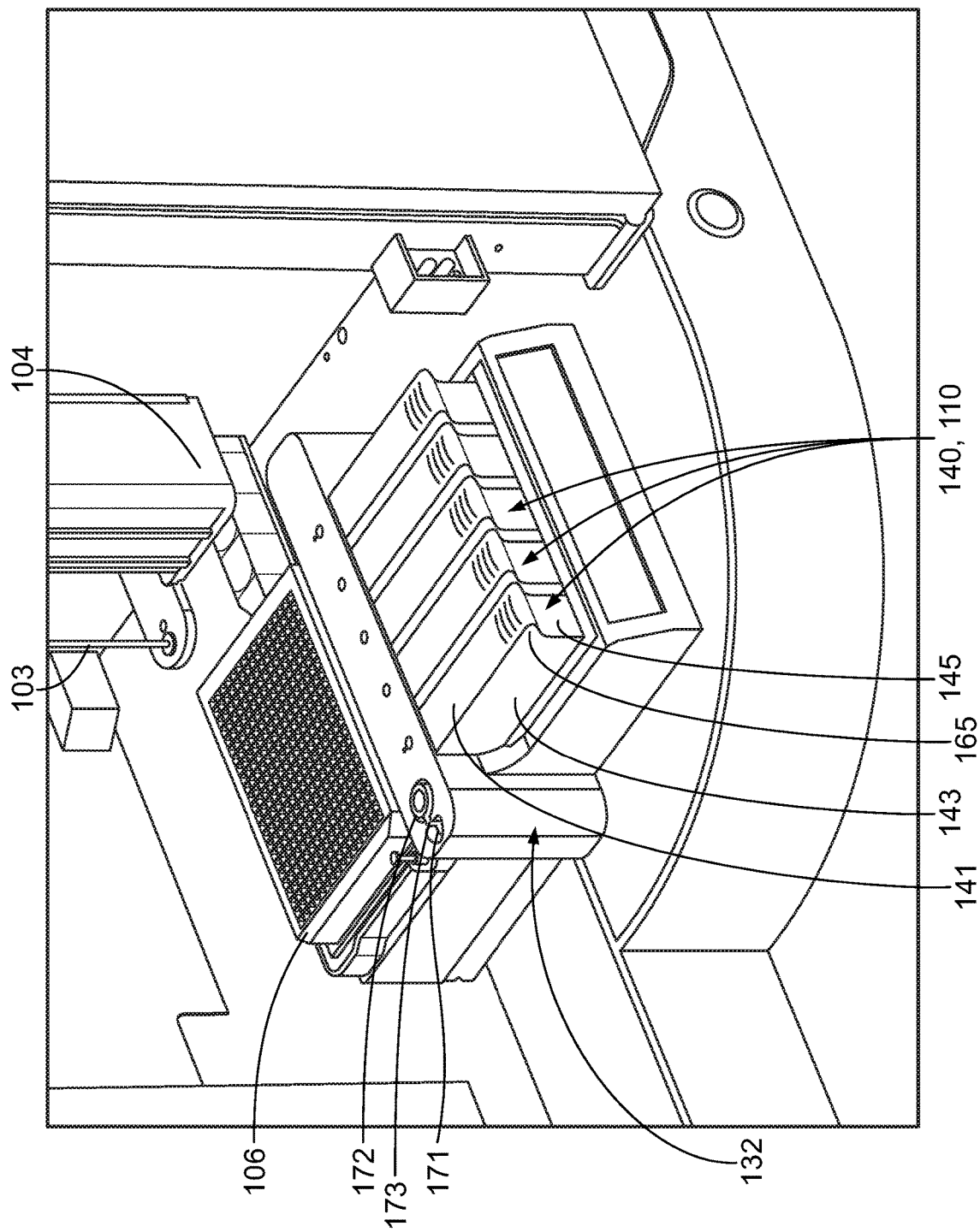
FIG. 6 shows a flow cytometry system that includes the rinse station apparatus, according to an example implementation.

In one optional embodiment, as shown in FIG. 5, the base 120 of the at least one cartridge docking station 115 is coupled to the at least one load cell 185 such that the first end 121 of the base 120 is cantilevered off of a first end 190 of the load cell 185. In one optional embodiment, the base 120 of the at least one cartridge docking station 115 is coupled to a first end 190 of the at least one load cell 185 via a pivot mount 191 such that the first end 121 of the base 120 is cantilevered off of the first end 190 of the load cell 185 and the base 120 is elevated above the at least one load cell 185. In a further optional embodiment, the rinse station apparatus 105 includes a pair of flexible supports 192 having a first end 193 coupled to the base 120 and a second end 194 coupled to the load cell 185. The pair of flexible supports 192 are arranged on either side of the pivot mount 191 and are configured to provide a restorative force to the base 120 in response to being compressed. These flexible supports 192 may take the form of leaf springs, torsion springs, compression springs or any other mechanism that is configured to provide a restorative force. The rinse station apparatus 105 also includes a vibration motor 113 coupled to a bottom side of the first end 121 of the base 120 of the at least one cartridge docking station 115 and configured to impart a rocking motion to the at least one cartridge docking station 115 about the pivot mount 191. In one optional embodiment, the fluid station circuit board 101 is electrically coupled to the vibration motor 113 and the microcontroller 102 is configured to transmit a signal to the vibration motor 113 via the fluid station circuit board 101 to power on, to power off or to power on for a specified duration. The probe 103 is able to sample from the cartridge 110 during vibration.

To demonstrate the effectiveness of the foregoing example embodiment, four tests were conducted with a prototype cartridge docking station 115 coupled to a vibration motor 113. Two tests were conducted with the vibration motor 113 in operation and the other two tests were conducted with the vibration motor 113 powered off. For each test run, a 29 mL cartridge 110 was filled with a solution containing marker beads. The cartridge 110 was sampled once a minute over the course of 25 hours. The samples were passed through a flow cytometer system to count the number of marker beads in each sample.

The number of marker beads decreased linearly over the 25 hours for the two test runs without any agitation by the vibration motor 113, and the bead counts approached zero. This demonstrated the marker beads were falling out of suspension and settling. The two test runs with agitation by the vibration motor 113 did not show a linear decrease in marker bead counts. Instead, the marker bead counts rapidly decreased for the first few hours until the system reached steady state between 100-120 particles per sample. Then the marker bead counts and concentration plateaued and remained constant for the remainder of the experiment.

For purposes of operation, the particle concentration does not need to remain at a consistent level. Rather, the concentration should remain above a certain threshold to prevent Well-ID from failing. The number of particles in the fluid of cartridge 110 can be increased by the vibration motor 113 to prevent the steady state particle concentration from falling below the minimum threshold. The duration of agitation by the vibration motor 113 and the amplitude may be increased to achieve the same result. The amplitude and duration of agitation may also be adjusted based on the liquid-level measurements received from the load cell 185.

In one optional embodiment, the rinse station apparatus 105 includes a linear actuator 114 fixedly coupled to a first end 190 or the second end 179 of the at least one load cell 185, the linear actuator 114 having an actuating arm 116 coupled to the first end 121 or the second end 122 of the base 120 of the at least one cartridge docking station 115 and configured to impart a rocking motion to the at least one cartridge docking station 115 about the pivot mount 191. In an alternative embodiment, the linear actuator 114 may have an actuating arm 116 coupled to the second end 122 of the base 120 of the at least one cartridge docking station 115. In one optional embodiment, the fluid station circuit board 101 is electrically coupled to the linear actuator 114 and the microcontroller 102 is configured to transmit a signal to the linear actuator 114 via the fluid station circuit board 101 to power on, to power off or to power on for a specified duration. In addition, the amplitude and frequency of the linear actuator 114 may be adjusted based on the liquid-level measurements received from the load cell 185. The probe 103 is able to sample from the cartridge 110 during linear actuation.

In operation, the technical effect of the vibration motor 113 and the linear actuator is to shake the cartridge 110 to avoid the operator having to manually re-suspend the fluid in the cartridge 110. Activation of the vibration motor 113 or linear actuator 114 causes cartridge docking station 115 to vibrate or rock and thereby promotes mixing of the fluid in the cartridge 110. The vibration motor 113 and the linear actuator 114 may beneficially permit long duration testing to be conducted without the need to pause or stop an experiment and re-suspend the fluid, faster start up on future experiments, improved consistency in particle concentration within the cartridge 110, prevent particles from adhering to the walls of the cartridge 110 and permit adjustments for multiple different fluid and particle solutions.

In one optional embodiment, the rinse station apparatus 105 includes a shield circuit board 117 electrically coupled to the microcontroller 102. In operation, the shield circuit board 117 steps down the voltage to appropriately interface with the rinse station apparatus 105 and various motors included therein. The shield circuit board 117 also includes relays that control the motors of the rinse station apparatus 105. The rinse station apparatus 105 also includes an embedded processor 111 electrically coupled to the microcontroller 102 and to the shield circuit board 117. And the rinse station apparatus 105 further includes a workstation computer 112 electrically coupled to the embedded processor 111 and configured to receive and process commands from an operator. In a further optional embodiment, a USB Hub 118 may be electrically coupled to a power supply 119, to the embedded processor 111 and to the microcontroller 102 in order to provide power to the embedded processor 111 and the microcontroller 102.

In still another optional embodiment, the rinse station apparatus 105 includes reciprocal mating components between the at least one cartridge 110 and the at least one cartridge docking station 115. The reciprocal mating components include (i) at least one male component extending from either the base 120 of the at least one cartridge docking station 115 or the bottom surface 142 of the housing 140 of the at least one cartridge 110 and at least one corresponding female component defined within the other of the base 120 of the at least one cartridge docking station 115 or the bottom surface 142 of the housing 140 of the at least one cartridge 110 or (ii) a first RFID tag coupled to the at least one cartridge docking station 115 configured to pair with a second RFID tag coupled to the at least one cartridge 110 and to send a signal to the microcontroller 102 to indicate a match, (iii) a barcode coupled to the at least one cartridge and a scanner coupled to the at least one cartridge docking station, or (iv) a QR code coupled to the at least one cartridge and a camera and processor with imaging software coupled to the at least one cartridge docking station. The technical effect of the reciprocal mating components is to assist the operator with placement of the cartridge 100 with the correct liquid contents in the corresponding cartridge docking station 115.

IV. Example Methods

Referring now to FIG. 12, a method 300 is illustrated using the rinse station apparatus 105 of FIGS. 3-11 and computing device of FIGS. 1-2. Method 300 includes, at block 305, removably coupling the at least one cartridge 110 according to any one of foregoing embodiments with the rinse station apparatus 105 according to any one of the foregoing embodiments. Then, at block 310, the at least one load cell 185 determines a weight of the at least one cartridge 110 and contents thereof. Next, at block 315, the microcontroller 102 receives a signal that includes a load cell value corresponding to the weight of the at least one cartridge 110. In alternative embodiments, the signal that includes the load cell value may be received by the embedded processor 111 or workstation computer 112. Then, in response to receiving the signal that includes the load cell value corresponding to the weight of the at least one cartridge 110, the microcontroller 102 transmits a signal to an embedded processor 111 that controls a motorized carrier 104 coupled to a probe 103 for sampling within the at least one cartridge 110, at block 320. At block 325, either the microcontroller 102 or the embedded processor 111 determines a depth of the contents of the at least one cartridge 110 based on the load cell value.

In one optional embodiment, the embedded processor 111 or the microcontroller 102 determines a sampling depth for a tip 109 of the probe 103 within the at least one cartridge 110 based on the determined depth of the contents of the at least one cartridge 110. In operation, the sampling depth is approximately set for 8 mm of immersion to prevent tolerance stackup from causing the probe 103 to miss the liquid contents of the cartridge 110. The tolerances are determined based on probe positioning, mechanical sensing of the cartridge location, and load cell measurements corresponding to the level of the liquid contents therein. The sampling depth is also calculated to maintain the probe 103 at least 0.5 mm from the bottom surface 142 of the cartridge 110.

In one optional embodiment, the microcontroller 102 transmits a signal to an eccentric gear motor 196 of a vortexing microfuge shaker 195 to power on, to power off or to power on for a specified duration the vortexing microfuge shaker 195.

In one optional embodiment, the method 300 further includes the microcontroller 102 transmitting a signal to a vibration motor 113 coupled to the base 120 of the at least one cartridge docking station 115 to power on, to power off or to power on for a specified duration. In an alternative optional embodiment, the method 300 includes the microcontroller 102 transmitting a signal to a linear actuator 114 coupled to the base 120 of the at least one cartridge docking station 115 to power on, to power off or to power on for a specified duration.

In one optional embodiment, the method 300 further includes the microcontroller 102 determining that the determined depth of the contents of the at least one cartridge 110 is below a sampling threshold, and the microcontroller 102 transmitting a signal to a workstation computer 112 to display an alert for an operator. The sampling threshold may be set at a depth that permits the system to continue operating for a set duration of time (e.g., several minutes) after the alert is displayed before the microcontroller 102, the embedded processor 111 or the workstation computer 112 stop or pause the sampling activity. Alternatively, the sampling threshold may be set at a depth that immediately causes the microcontroller 102, the embedded processor 111 or the workstation computer 112 stop or pause the sampling activity.

In one optional embodiment, the method 300 further includes applying a force, via an operator, to a protrusion coupled to and extending from the rear wall 145 of the housing 140 of the at least one cartridge 110 adjacent to the top surface 141 of the housing 140 of the at least one cartridge 110 and thereby flexing the locking arm 175 outwardly and releasing the detent 170 from the locking arm 175. In this embodiment, method 300 also includes applying a force to a front wall 144 of the at least one cartridge 110, via the spring 180 coupled to the front face 131 of the vertical support 130 of the at least one cartridge docking station 115.

In one optional embodiment, the method 300 further includes converting, via an analog-to-digital converter electrically coupled to the fluid station circuit board 101 and the load cell 185, an analog signal from the load cell 185 to a digital signal.

In one optional embodiment, a pair of reciprocal mating components are provided between the at least one cartridge 110 and the at least one cartridge docking station 115. The reciprocal mating components comprise a first RFID tag coupled to the at least one cartridge docking station 115 configured to pair with a second RFID tag coupled to the at least one cartridge 110 and to send a signal to the microcontroller 102 to indicate a match. In this embodiment, method 300 further includes receiving, via the microcontroller 102, a signal identifying the first RFID tag. Then, the microcontroller 102 receives a signal identifying the second RFID tag. Next, the microcontroller 102 determines whether the first RFID tag pairs with the second RFID tag. And the microcontroller 102 sends a signal with a determination of pairing between the first RFID tag and the second RFID tag.

In one optional embodiment, method 300 includes the embedded processor 111 determining the depth of the contents of a first cartridge 110 is at or below a minimum threshold vale based on the load cell value. And the embedded processor 111 sends a signal to the motorized carrier 104 to sample from a second cartridge 110.

As discussed above, a non-transitory computer-readable medium having stored thereon program instructions that upon execution by a processor 202 may be utilized to cause performance of any of functions of the foregoing methods.

As one example, a non-transitory computer-readable medium having stored thereon program instructions that upon execution by a processor, cause performance of a set of acts includes at least one load cell 185 of the rinse station apparatus 105 according to any of the foregoing embodiments determining a weight of at least one cartridge 110 according to any of the foregoing embodiments and the contents thereof. A microcontroller 102 then receives a signal that includes a load cell value corresponding to the weight of the at least one cartridge 110. In response to receiving the signal that includes the load cell value corresponding to the weight of the at least one cartridge 110, the microcontroller 102 transmits a signal to an embedded processor 111 that controls a motorized carrier 104 coupled to a probe 103 for sampling within the at least one cartridge 110. And the embedded processor 111 then determines a depth of the contents of the at least one cartridge 110 based on the load cell value.

In one optional embodiment, the non-transitory computer-readable medium further includes the embedded processor 111 determining a sampling depth for a tip 109 of the probe 103 within the at least one cartridge 110 based on the determined depth of the contents of the at least one cartridge 110.

In another optional embodiment, the non-transitory computer-readable medium further includes the microcontroller 102 transmitting a signal to an eccentric gear motor 196 of a vortexing microfuge shaker 195 to power on, to power off or to power on for a specified duration the vortexing microfuge shaker 195.

In a yet another optional embodiment, the non-transitory computer-readable medium further includes the microcontroller 102 transmitting a signal to a vibration motor 113 coupled to the base 120 of the at least one cartridge docking station 115 to power on, to power off or to power on for a specified duration. In an alternative optional embodiment, the microcontroller 102 transmits a signal to a linear actuator 114 coupled to the base 120 of the at least one cartridge docking station 115 to power on, to power off or to power on for a specified duration.

In still another optional embodiment, the non-transitory computer-readable medium further includes the microcontroller 102 determines that the determined depth of the contents of the at least one cartridge 110 is below a sampling threshold. And then the microcontroller 102 transmits a signal to a workstation computer 112 to display an alert for an operator.

In another optional embodiment, the non-transitory computer-readable medium further includes an analog-to-digital converter electrically coupled to the fluid station circuit board 101 and the load cell 185 converting an analog signal from the load cell 185 to a digital signal.

In yet another optional embodiment, a pair of reciprocal mating components are provided between the at least one cartridge 110 and the at least one cartridge docking station 115. The reciprocal mating components comprise a first RFID tag coupled to the at least one cartridge docking station 115 configured to pair with a second RFID tag coupled to the at least one cartridge 110 and to send a signal to the microcontroller 102 to indicate a match. And the set of acts of the non-transitory computer-readable medium further includes the microcontroller 102 receiving a signal identifying the first RFID tag, the microcontroller 102 receiving a signal identifying the second RFID tag, the microcontroller 102 determining whether the first RFID tag pairs with the second RFID tag, and the microcontroller 102 sending a signal with a determination of pairing between the first RFID tag and the second RFID tag.

In a further optional embodiment, the non-transitory computer-readable medium further includes the embedded processor 111 determining the depth of the contents of a first cartridge 110 is at or below a minimum threshold vale based on the load cell value, and the embedded processor 111 sending a signal to the motorized carrier 104 to sample from a second cartridge 110.

The description of different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

We claim:

1. A rinse station apparatus for flow cytometry, comprising:
   at least one cartridge docking station having a base with a recessed receptacle configured to receive a cartridge, a vertical support coupled to a first end of the base and a top support coupled to the vertical support and cantilevered over the base, wherein the top support has an opening arranged therethrough that is configured to align with an opening in the cartridge;
   a locking arm coupled to a second end of the base, a free end of the locking arm has a ridge configured to cooperate with a detent coupled to a rear wall of the cartridge to retain the cartridge in place on the at least one cartridge docking station;
   a spring coupled to a front face of the vertical support and configured to apply force to a front wall of the cartridge to bias the cartridge toward the locking arm; and
   at least one load cell coupled to the base of the at least one cartridge docking station, wherein the load cell is configured to measure a weight of the cartridge.

2. The rinse station apparatus of claim 1, wherein a surface of the recessed receptacle that is configured to support the cartridge has an angle ranging from 1 degree to 45 degrees such that the surface of the recessed receptacle is inclined from the first end of the base toward the second end of the base.

3. The rinse station apparatus of claim 1, the at least one load cell has a cross-arm with a fixed-geometry stop configured to limit displacement of the load cell in response to a docking force from the cartridge.

4. The rinse station apparatus of claim 1, wherein the base of the at least one cartridge docking station is coupled to the at least one load cell such that the first end of the base is cantilevered off of a first end of the load cell.

5. The rinse station apparatus of claim 1, wherein the locking arm is biased toward a locked position and is configured to flex outwardly to an open position under application of a downward force or an upward force from the cartridge.

6. The rinse station apparatus of claim 1, further comprising:
   a vortexing microfuge shaker having a motor;
   a carrier vessel for a microfuge tube; the motor coupled to a first end of the carrier vessel for a microfuge tube via a spherical joint,
   a platform suspended above the motor via a plurality of uprights, the platform supporting a second end of the carrier vessel, the platform has a cap retention cavity arranged adjacent to the second end of the carrier and that is configured to receive a cap coupled to the microfuge tube via a living hinge.

7. The rinse station apparatus of claim 1, wherein the at least one cartridge docking station is a plurality of cartridge docking stations arranged adjacent to each other, wherein the at least one load cell is a plurality of load cells each coupled to the base of one of the plurality of cartridge docking stations.

8. The rinse station apparatus of claim 6, further comprising a unifying housing having a top surface overlying the top support of each of the plurality of cartridge docking stations and the platform of the vortexing microfuge shaker, the top surface of the unifying housing has a plurality of openings therethrough each aligned with one of the openings of the top support of the plurality of cartridge docking stations, an opening of the carrier vessel of the vortexing microfuge shaker, and the cap retention cavity, the unifying housing has a first vertical support coupled to the top surface at a first end, the first vertical support forms a cavity configured to receive the vortexing microfuge shaker, the unifying housing has a second vertical support coupled to the top surface at a second end, and the unifying housing has a vertical wall extending between the first vertical support and the second vertical support that that together form a recess to receive the first end of the base, the vertical support and the top support of each of the plurality of cartridge docking stations, and the unifying housing has a base frame extending outward from the vertical wall with an opening surrounding the plurality of cartridge docking stations and the plurality of load cells, wherein a height of the base frame corresponds to a combined height of one of the plurality of load cells coupled to one of the plurality of cartridge docking stations.

9. The rinse station apparatus of claim 1, further comprising:
   a fluid station circuit board electrically coupled to the at least one load cell;
   an analog-to-digital converter electrically coupled to the fluid station circuit board and the at least one load cell;
   a microcontroller electrically coupled to the fluid station circuit board;
   a motorized carrier that is electrically coupled to the microcontroller; and
   a probe coupled to the motorized carrier that is electrically coupled to the microcontroller, wherein the motorized carrier is configured to move between the at least one cartridge docking station and a well plate, wherein the probe has an outer support sleeve and an inner probe that extends a distance beyond the outer support sleeve, wherein the microcontroller is configured to receive a signal that includes a load cell value corresponding to a weight of the cartridge and to transmit a signal to the motorized carrier that includes a sampling depth for a tip of the probe within the cartridge.

10. The rinse station apparatus of claim 6, wherein the vortexing microfuge shaker is electrically coupled to the fluid station circuit board and wherein the microcontroller is configured to transmit a signal to the motor of the vortexing microfuge shaker via the fluid station circuit board to power on, to power off or to power on for a specified duration.

11. The rinse station apparatus of claim 1, wherein the base of the at least one cartridge docking station is coupled to a first end of the at least one load cell via a pivot mount such that the first end of the base is cantilevered off of the first end of the load cell and the base is elevated above the at least one load cell.

12. The rinse station apparatus of claim 11, further comprising:
a pair of flexible supports having a first end coupled to the base and a second end coupled to the load cell, the pair of flexible supports are arranged on either side of the pivot mount and are configured to provide a restorative force to the base in response to being compressed; and
a vibration motor coupled to a bottom side of the first end of the base of the at least one cartridge docking station and configured to impart a rocking motion to the at least one cartridge docking station about the pivot mount.

13. The rinse station apparatus of claim 11, wherein the fluid station circuit board is electrically coupled to the vibration motor and wherein the microcontroller is configured to transmit a signal to the vibration motor via the fluid station circuit board to power on, to power off or to power on for a specified duration.

14. The rinse station apparatus of claim 11, further comprising:
a linear actuator fixedly coupled to a first end of the at least one load cell, the linear actuator having an actuating arm coupled to the first end of the base of the at least one cartridge docking station and configured to impart a rocking motion to the at least one cartridge docking station about the pivot mount.

15. The rinse station apparatus of claim 11, wherein the fluid station circuit board is electrically coupled to the linear actuator and wherein the microcontroller is configured to transmit a signal to the linear actuator via the fluid station circuit board to power on, to power off or to power on for a specified duration.

16. The rinse station apparatus of claim 9, further comprising:
a shield circuit board electrically coupled to the microcontroller;
an embedded processor electrically coupled to the microcontroller and to the shield circuit board; and
a workstation computer electrically coupled to the embedded processor and configured to receive and process commands from an operator.

17. The rinse station apparatus of claim 1, further comprising at least one cartridge removably coupled to the at least one cartridge docking station, wherein the at least one cartridge comprises:
a housing having a top surface, a bottom surface, a pair of opposing sidewalls, a front wall and a rear wall that together define a cavity, wherein an opening is defined through the top surface of the housing adjacent to the front wall, and the opening is surrounded by an annular ring having a shoulder at a first end and a second end that extends into the cavity; and
a re-sealable plug having a tubular body with a flange arranged at a first end such that the tubular body is disposed within the annular ring and the flange abuts the shoulder of the annular ring, a cap is coupled to the flange of the re-sealable plug via a living hinge and is configured to move between a sealed position in which a portion of the cap is recessed within an opening of the re-sealable plug and an unsealed position in which the cap and living hinge extend over a portion of the top surface.

18. The rinse station apparatus of claim 17, wherein the at least one cartridge further comprises a cone-shaped baffle coupled to the second end of the annular ring.

19. The rinse station apparatus of claim 17, wherein the at least one cartridge further comprises a protrusion coupled to and extending from the rear wall of the housing adjacent to the top surface of the housing.

20. The rinse station apparatus of claim 17, wherein the at least one cartridge further comprises a detent coupled to the rear wall of the housing adjacent to the bottom surface of the housing.

21. The rinse station apparatus of claim 17, wherein the shoulder of the annular ring is inset in the top surface of the housing.

22. The rinse station apparatus of claim 17, wherein the shoulder of the annular ring corresponds to the first end of the annular ring that extends above the top surface of the housing.

23. The rinse station apparatus of claim 17, wherein the bottom surface of the housing has an angle ranging from 1 degree to 45 degrees such that the at least one cartridge is inclined from the front wall toward the rear wall.

24. The rinse station apparatus of claim 17, further comprising:
reciprocal mating components between the at least one cartridge and the at least one cartridge docking station, wherein the reciprocal mating components comprise (i) at least one male component extending from either the base of the at least one cartridge docking station or the bottom surface of the housing of the at least one cartridge and at least one corresponding female component defined within the other of the base of the at least one cartridge docking station or the bottom surface of the housing of the at least one cartridge, (ii) a first RFID tag coupled to the at least one cartridge docking station configured to pair with a second RFID tag coupled to the at least one cartridge and to send a signal to the microcontroller to indicate a match, (iii) a barcode coupled to the at least one cartridge and a scanner coupled to the at least one cartridge docking station, or (iv) a QR code coupled to the at least one cartridge and a camera and processor with imaging software coupled to the at least one cartridge docking station.

* * * * *